United States Patent
Butler et al.

(10) Patent No.: US 12,133,516 B2
(45) Date of Patent: Nov. 5, 2024

(54) LOBSTER TRAP ACCESSORY

(71) Applicants: Mark Butler, Miami, FL (US); Norman Munroe, Miami, FL (US)

(72) Inventors: Mark Butler, Miami, FL (US); Norman Munroe, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 64 days.

(21) Appl. No.: 17/840,947

(22) Filed: Jun. 15, 2022

(65) Prior Publication Data
US 2023/0404047 A1 Dec. 21, 2023

(51) Int. Cl.
*A01K 69/08* (2006.01)

(52) U.S. Cl.
CPC .................... *A01K 69/08* (2013.01)

(58) Field of Classification Search
CPC ......... B63B 22/10; B63B 22/00; B63B 22/06; B63B 22/16; B63B 22/08; B63B 22/12; B63B 22/14; B63B 22/18; B63B 22/003; B63B 22/22; B63B 2021/225; B63B 2201/00; B63B 2201/02; B63B 2201/04; B63B 2201/08; B63B 2205/00; B63B 2205/02; B63B 2205/06; A01K 69/00; A01K 69/06; A01K 69/08; A01K 69/10; A01K 79/00
USPC ....... 43/43.12, 100, 102, 105; 441/1, 2, 6, 7, 441/8, 9, 10, 11, 12, 13, 21, 23, 24, 25, 441/26, 27, 30, 31, 32, 33
See application file for complete search history.

(56) References Cited

U.S. PATENT DOCUMENTS

| | | | | |
|---|---|---|---|---|
| 457,174 A | * | 8/1891 | Ward | B63B 22/10 441/8 |
| 832,881 A | * | 10/1906 | Skinner | 43/43.11 |
| 1,173,743 A | * | 2/1916 | Mullins | B60H 1/28 292/262 |
| 3,426,472 A | * | 2/1969 | Richard | A01K 69/08 43/100 |
| 3,724,120 A | * | 4/1973 | Richard | A01K 69/06 43/43.12 |
| 3,992,804 A | * | 11/1976 | Senese | A01K 69/08 43/103 |

(Continued)

FOREIGN PATENT DOCUMENTS

WO WO-2021252663 A1 * 12/2021 ............. A01K 97/02

*Primary Examiner* — Darren W Ark
*Assistant Examiner* — Brook Victoria Schmid
(74) *Attorney, Agent, or Firm* — SALIWANCHIK, LLOYD & EISENSCHENK (57) ABSTRACT

A trap accessory for attachment to a marine trap that facilitates release of by-catch. A buoyant recovery buoy is operably attached to a trap frame secured to the marine trap. Components for operably attaching the recovery buoy to the trap frame include a latch and attachment components, of which at least one of these components is a Degradable Metal (DM). The DM maintains the integrity of the trap and trap accessory for a pre-determined time, typically 1 year or less. When one or more of the DM components are sufficiently degraded, the recovery buoy is released to open a slot through which animals can escape. A buoy line connected to the trap frame maintains connection between the marine trap and the recovery buoy, which assists in recovery of the marine trap.

19 Claims, 7 Drawing Sheets

(56) References Cited

U.S. PATENT DOCUMENTS

| | | | | |
|---|---|---|---|---|
| 5,894,694 A * | 4/1999 | Erlandson | ............... | A01K 69/06 43/103 |
| 6,739,924 B1 * | 5/2004 | Groen | .................... | A01K 69/06 441/2 |
| 6,880,290 B2 * | 4/2005 | Mahoney | ................ | A01K 97/24 43/4.5 |
| 7,534,152 B1 * | 5/2009 | Lloyd | .................... | A01K 69/06 441/2 |
| 9,126,658 B1 * | 9/2015 | Ryan | ........................ | A01K 71/00 |
| 2005/0229477 A1 * | 10/2005 | Gomez, Jr. | ............ | A01K 69/10 43/100 |
| 2009/0249681 A1 * | 10/2009 | Havens | .................. | A01K 69/06 43/100 |

* cited by examiner

LOBSTER TRAP ACCESSORY

BACKGROUND

The two largest trap-based fisheries in south Florida are those for the Caribbean spiny lobster and Stone Crab. The spiny lobster fishery is the largest in the Caribbean (SEDAR 2019) and stone crabs are the target of valuable fisheries throughout the Gulf of Mexico (Gandy et al. 2016). Both species are also ecologically important as benthic predators and prey in coastal habitats. Although fishing methodologies for these species vary geographically, in Florida the commercial harvest of both is primarily done using traps. In the case of lobster, about 20% of total lobster landings are by recreational divers and another 5% attributable to alternative fishing methods (e.g., commercial divers, bully-net fishers; Florida Wildlife Commission (FWC) 2017). Landings of lobster in Florida in 2020 were approximately 3.6M lbs. and valued at over $25M dockside (FWC 2021). Stone crab claw landings are exclusively based on traps, the great majority being commercial traps. Annual landings of stone crabs have varied appreciably but have declined in Florida since 2001. Yet, their high market value has sustained high revenues for the fishery that have exceeded $30M annually (Crowley et al. 2019).

The greatest environmental and economic management problem for lobster and other fisheries is derelict traps. Derelict traps are one of the most persistent and damaging consequences of commercial trap-based fishing because of the inadvertent production of marine debris. Traps are typically lost when their buoys are detached by storms, boat props, vandalism, abandonment, and bottom entanglement (Breen 1990, Clark et al. 2012, Guillory et al. 2001, Lewis et al. 2009, Shively 1997, Uhrin and Fonseca 2005). Derelict traps and lines damage boats, negatively impact marine habitats (e.g., corals/octocorals, seagrass, sponge beds), kill fish and invertebrates as bycatch through "ghost fishing", entangle endangered marine mammals and turtles, and constitute significant direct and indirect financial losses to the fishing industry (Forrester et al. 1975, Heinsohn et al. 1976, Hartman 1979, Beck and Barros 1991, Marsh 2000, Donohue et al. 2001, Noke and O'Dell 2002, Chiappne et al. 2002, 2005, Matsuoka et al. 2005, NOAA 2008, Wells et al. 2008, Lewis et al. 2009, MacFadyen et al. 2009, Hines et al. 2012, Smith and Edgar 2014, Scheld et al. 2016, Arthur et al. 2014, 2020).

Most (~90%) traps used in the fishery are rectangular wood slat-style traps marked with identifying numbers and buoys bearing color patterns assigned each licensed fisher. The degradation of abandoned and derelict wood slat lobster traps depends on the local environment but on average traps remain intact and continue to "fish" for about 1½ yrs., some for up to 3 yrs. (Butler and Matthews 2015). Intact lost traps are referred to as "ghost" traps because they continue to trap lobsters and other species, which cannot escape from the intact trap.

Marine debris removal programs are a common "solution" to the problem of trap loss, but are an expensive post hoc approach to the problem with limited effectiveness. The installation of escape gaps or "cull rings" to reduce bycatch mortality in traps does not reduce the mortality of larger species caught in lost traps and is an untenable option in Florida's unique spiny lobster fishery that depends on sub-legal lobsters as "live bait" (Lyons and Hunt 1991).

There is a need in the industry for traps, particularly lobster traps, which are automatically disabled after a pre-determined time in a marine environment. A device that can be attached to a lobster trap that will disable or decommission the trap can inhibit unintended entrapment of marine animals. It would also be helpful if such device allows for recovery of traps by fishers. Ideally, the device would be cost effective and capable of implementation on currently utilized lobster traps. Such a device could improve the sustainability and productivity of trap-based coastal fisheries through the reduction of bycatch and the increased recovery of derelict traps.

BRIEF SUMMARY

The subject invention provides a trap accessory that addresses the problem of derelict traps and unintended entrapment of aquatic animals. A trap accessory can be attached to a trap, such as a lobster trap, and can provide an exit from the trap after a pre-determined time when the trap remains in a aquatic environment. Embodiments of a trap accessory include a recovery buoy releasably secured to a trap frame with at least one attachment component. The attachment component can comprise one or more degradable metals that degrade or deteriorate in an aquatic environment. When the degradable metals reach a point of failure, the recovery buoy is released from the trap frame, which opens a slot through which aquatic animals can exit the trap. The recovery buoy can be operably connected to the trap frame with a buoy line that is contained within a buoy line canister fixedly attached to the trap frame. The released recovery buoy can float to the water surface while pulling the buoy line from the buoy line canister. Alternatively, the buoy line can be wrapped around a cylindrical-shaped buoy to unwind as the buoy floats to the water surface. This allows the recovery buoy to remain attached to the trap frame to indicate the location of the derelict trap for recovery.

BRIEF DESCRIPTION OF DRAWINGS

In order that a more precise understanding of the above recited invention can be obtained, a more particular description of the invention briefly described above will be rendered by reference to specific embodiments thereof that are illustrated in the appended drawings. The drawings presented herein may not be drawn to scale and any reference to dimensions in the drawings or the following description are specific to the embodiments disclosed. Any variations of these dimensions that will allow the subject invention to function for its intended purpose are considered to be within the scope of the subject invention. Thus, understanding that these drawings depict only typical embodiments of the invention and are not therefore to be considered as limiting in scope, the invention will be described and explained with additional specificity and detail in which:

FIGS. 16A and 16B are illustrations of an alternative embodiment for connecting the recovery buoy and trap frame of a trap accessory, according to the subject invention. As shown, this embodiment utilizes a frame extension on the trap frame and a connector flange on the recovery buoy that are attached with a degradable attachment component. FIG. 16B is an enlarged view.

FIG. 17 shows an embodiment of a trap accessory with a cylindrical-shaped buoy around which a buoy line is wound.

DETAILED DISCLOSURE

The subject invention pertains to improvements in commercial and recreational traps used for harvesting aquatic species. More specifically, the subject invention provides a trap accessory that disables or decommissions a trap exposed to an aquatic environment after a predetermined time. The ability to disable or decommission a trap can ensure that derelict traps do not become "ghost traps" that continue fishing and inadvertently killing by-catch.

Figure 2:
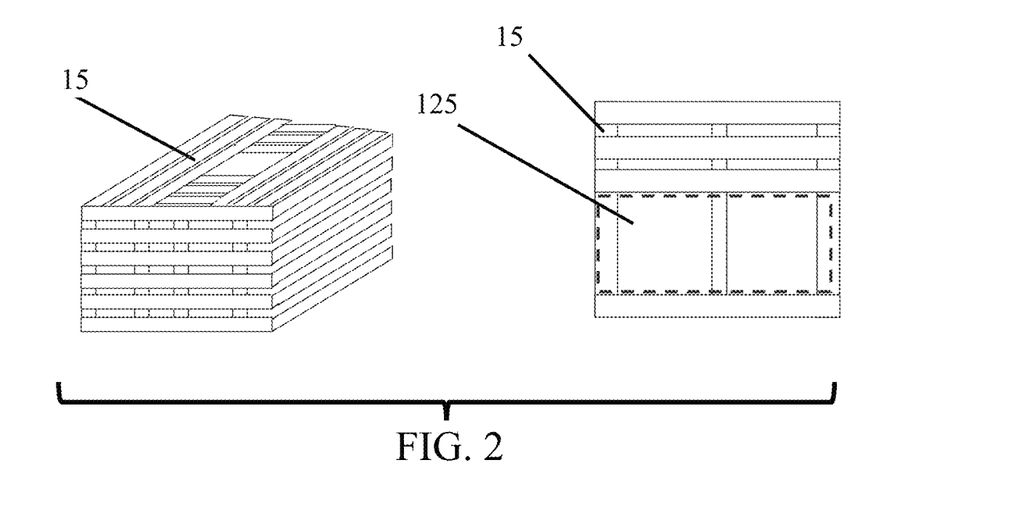
FIG. 2 shows photographs of a conventional lobster trap (left) and a lobster trap with the two wood slats removed (right) from one side end of the trap. The superimposed white dashed rectangle indicates the position where an embodiment of a trap accessory can be installed.

The subject invention is particularly advantageous for lobster and crab traps, but can also be utilized with other types of aquatic traps. The lobster and crab traps commonly used by commercial and recreational harvesters are rectangular slat-style traps, such as shown, for example, in FIG. 2 (left), which are typically marked with identifying indicia and have attached buoys with an assigned color pattern. Advantageously, a trap accessory of the subject invention can be incorporated with or attached to these types of traps by removing some of the slats to provide a gap in which the trap accessory can be attached, thereby replacing the removed slats, as shown in FIG. 2 (right). The subject invention could also be utilized with wire traps by creating a gap over which the trap accessory can be secured. When deployed, the trap accessory opens the gap and provides an exit or opening, which can allow by-catch to escape.

In the description that follows, a number of terms are utilized. In order to provide a clear and consistent understanding of the specification and claims, the following definitions are provided.

The term "trap" as used herein, refers to any cage or enclosure designed to catch and retain aquatic animals, typically by allowing entry but no exit. A trap can comprise, wood, plastic, wire, as well as other materials and combinations thereof. This includes, but is not limited to, lobster traps, blue crab traps, stone crab traps, and fish traps.

As used herein, the terms "aquatic" and "aquatic environment" refer to fresh, brackish, or saltwater and environments thereof in which a trap, fitted with an embodiment of the subject invention, can be used to capture aquatic animals.

As used herein, the phrase "point of failure" means when at least one latch, one or more attachment components, or some cooperating piece thereof corrodes, weakens, is destroyed, breaks, separates, or is otherwise rendered incapable of maintaining the recovery buoy in the trap frame.

The terms "about" or "approximately," as used herein, are defined as at least close to a given value, direction, or either end of a range, as is necessary to cover manufacturing variances, equipment tolerances, and normal variances in material, as understood by those skilled in the art.

The transitional term "comprising," which is synonymous with "including," or "containing," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. Use of the term "comprising" contemplates other embodiments that "consist" or "consist essentially of" the recited component(s).

Also, as used herein, and unless otherwise specifically stated, the terms "operable communication," "operable connection," "operably connected," "operably engaged," "cooperatively engaged," "cooperatively connected" and grammatical variations thereof mean that the particular elements are connected in such a way that they cooperate to achieve their intended function or functions. The "connection" or "engagement" may be direct, or indirect, physical, or remote. It is to be understood that the figures and descriptions of embodiments of the present invention have been simplified to illustrate elements that are relevant for a clear understanding of the invention, while eliminating, for purposes of clarity, other elements that may be well known. Those of ordinary skill in the art will recognize that other elements may be desirable and/or required in order to implement the present invention.

Finally, as used herein, terms indicating relative direction or orientation, including, but not limited to, "upper", "lower", "top", "bottom", "vertical", "horizontal", "outer", "inner", "side", "front", "back", and the like, are intended to facilitate description of the present invention by indicating relative orientation or direction in usual use. For example, a typical lobster trap, as shown in FIG. 2, has a bottom that rests on a surface, a top with an opening through which lobsters are retrieved, and sides that are slatted therebetween.

Reference will be made to the attached Figures on which the same reference numerals are used throughout to indicate the same or similar components. With reference to the attached Figures, which show certain embodiments of the subject invention, it can be seen in FIG. 1 that embodiments of a trap accessory 100 of the subject invention can include a buoyant or floatable recovery buoy 120 that is releasably secured within a trap frame 140. The trap frame and recovery buoy can be attached to each other with at least one of a latch 300 having a first end 310 and a second end 320 and an attachment component 340. At least one of the latch and the attachment component can and be made of a degradable material. A buoy line canister 200 can be attached to the trap or to the trap frame and can contain a length of buoy line 250. Alternatively, the buoy line can be wrapped around the buoy. The buoy line can be operably connected to the recovery buoy and unspools or unwinds from the buoy or the buoy line canister when the recovery buoy is deployed to rise towards and float on the water surface. Each of these general components can have one or more sub-components, which will be discussed in detail below.

The subject invention pertains to a trap accessory 100 that can be attached to a trap 15, such as typically utilized in an aquatic environment, as shown, for example, in FIG. 2. As shown in FIGS. 3-8, a trap accessory can utilize a trap frame 140 to temporarily retain a buoyant recovery buoy 120 on a trap. When the trap accessory is placed in an aquatic environment and automatically deployed after a pre-determined time, the recovery buoy is released to rise to and float on or at least near the water surface. A buoy line canister 200 can also be attached to the trap or to the trap frame and contains a length of spooled buoy line 250. Alternatively, the buoy line can be wrapped around a buoy, as shown, for example, in FIG. 17. The buoy line can be secured between the recovery buoy and the buoy line canister. When the trap accessory is deployed and the recovery buoy floats to the water surface, the buoy line unspools or unwinds to maintain a connection between the recovery buoy and the trap frame attached to the trap. The recovery buoy can provide a visible indication of the approximate location of the trap to be recovered.

In one embodiment, the trap accessory 100 is installed on a trap in place of, or as a substitute for, 1, 2, or 3 slats that have been removed from one of the sides of a trap, such as, for example, the narrow side of a lobster trap. FIG. 2 (right), shows an example of a trap 15 from which two slats have been removed allowing for attachment of a trap accessory in a gap created by removal of the slats, as indicated by the white dashed line. Components of a trap accessory, for example, the trap frame 140 and the recovery buoy 120, can be constructed of any of a variety of aquatic stable materials, such as, but not limited to, various types of plastics, rubber, metals, silicone, ceramics, and combinations thereof. In one embodiment, the recovery buoy 120 and the trap frame 140 are constructed of a plastic material. In a further embodiment, the trap frame and the recovery buoy are reusable. In one embodiment, the trap frame has multiple holes 142 by which the trap accessory can be operably connected, so that a back side, opposite to the side from which the recovery buoy is released, is against a trap. The recovery buoy and the trap frame can be operably connected to each other by one or more attachment components. In one embodiment, the attachment components can be utilized with one or more latches 300 secured to the trap frame and the trap accessory with one or more attachment components 340. At least one of the one or more latches, attachment components, and the buoy line 250 that unspools from the buoy line cannister 200 can be made of one or more materials that degrade in the aquatic environment at a specified or calculated rate. Thus, at least one of the latch, attachment component, and buoy line cannister, in which the buoy line is stored, can be a replaceable component of a trap accessory.

In a particular embodiment, when a trap 15 having an operably attached trap accessory 100 remains in the aquatic environment beyond a specified time, for example, between about 9 months to about 11 months, or past a legal fishing season, the latch 300 made of a degradable material can release the recovery buoy 120 when the latch degrades to a point of failure. This can open or expose the slot 145 to create an exit or gap through the trap frame that allows the free movement of animals in and out of the trap. The released recovery buoy can bear the buoy markings/numbers assigned to the licensed harvester and can remain attached to the trap via the unwinding or unspooling of the buoy line 250 from the buoy line cannister 200 as the recovery buoy floats to the water surface. The released recovery buoy can be visible at the water surface and, thus, can be found or discovered allowing the trap to be recovered. The length of the buoy line can be customized as necessary for trap deployment in different water depths. In one embodiment, the buoy line is at least 100 ft. in length. In one embodiment, buoy line is a small diameter monofilament line, such as commonly used for fishing. In another embodiment, buoy line can be small diameter and made of a material that degrades in the aquatic environment. Degradable fishing line is known in the art and can maintain an operable tensile strength for up to, for example, 12 months, before degradation begins. Embodiments of the subject invention can utilize this type of line for the buoy line, which can inhibit the long-term potential of an entanglement hazard to aquatic life. In one embodiment, the buoy line has an operable tensile strength of between approximately 10 lbs. and approximately 50 lbs. prior to degradation. In further embodiments, the buoy line has an operable tensile strength of between approximately 15 lbs. and approximately 30 lbs. prior to degradation. In a specific embodiment, the buoy line has an operable tensile strength of approximately 20 lbs. prior to degradation.

A trap frame 140 can have a shape and size amenable for attachment to a trap and for securing a recovery buoy 120. The shape and size can depend on the type of trap to which the trap accessory will be attached, but typically a rectangular shape is advantageous. This does not preclude other shapes, such as round, oval, or square, which may be more advantageous on certain types of traps. The trap frame can have two or more side arms 144 with a slot 145 therebetween in which the recovery buoy 120 can be operably arranged. The depth of the slot can depend on the thickness of the trap frame but is preferably a depth (D) that does not impede deployment of the recovery buoy. In one embodiment, the depth of a slot is between about 0.75 inches and about 1 inch, and preferably about 0.5 inch.

In one embodiment, the trap frame has at least one shelf 146 that projects from a side arm 144 of the trap frame into the slot. In a more particular embodiment, a shelf projects from at least two side arms into the slot in the trap frame. In a further embodiment, a shelf has a thickness that is less than the thickness of the trap frame and is arranged at or near the bottom side of a side arm. This allows the shelf to project into the slot below the outward facing front side of the trap frame. This can position the shelf at or near the back side of the slot, such as shown, for example, in FIGS. 4 and 8. This can further allow the recovery buoy 120 to be recessed into the slot and arranged and supported on the one or more shelves, which is demonstrated in FIG. 8. The distance that a shelf projects into the slot can vary depending on a variety of factors, including the dimensions of a latch 300, discussed below. Preferably, a shelf can project into a slot a sufficient distance to facilitate attachment of the recovery buoy to the shelf but does not inhibit escape of aquatic animals through the slot when the recovery buoy is deployed. In one embodiment, a shelf projects into the slot from a short side 141 of the trap frame.

Figures 18, 19, 20:
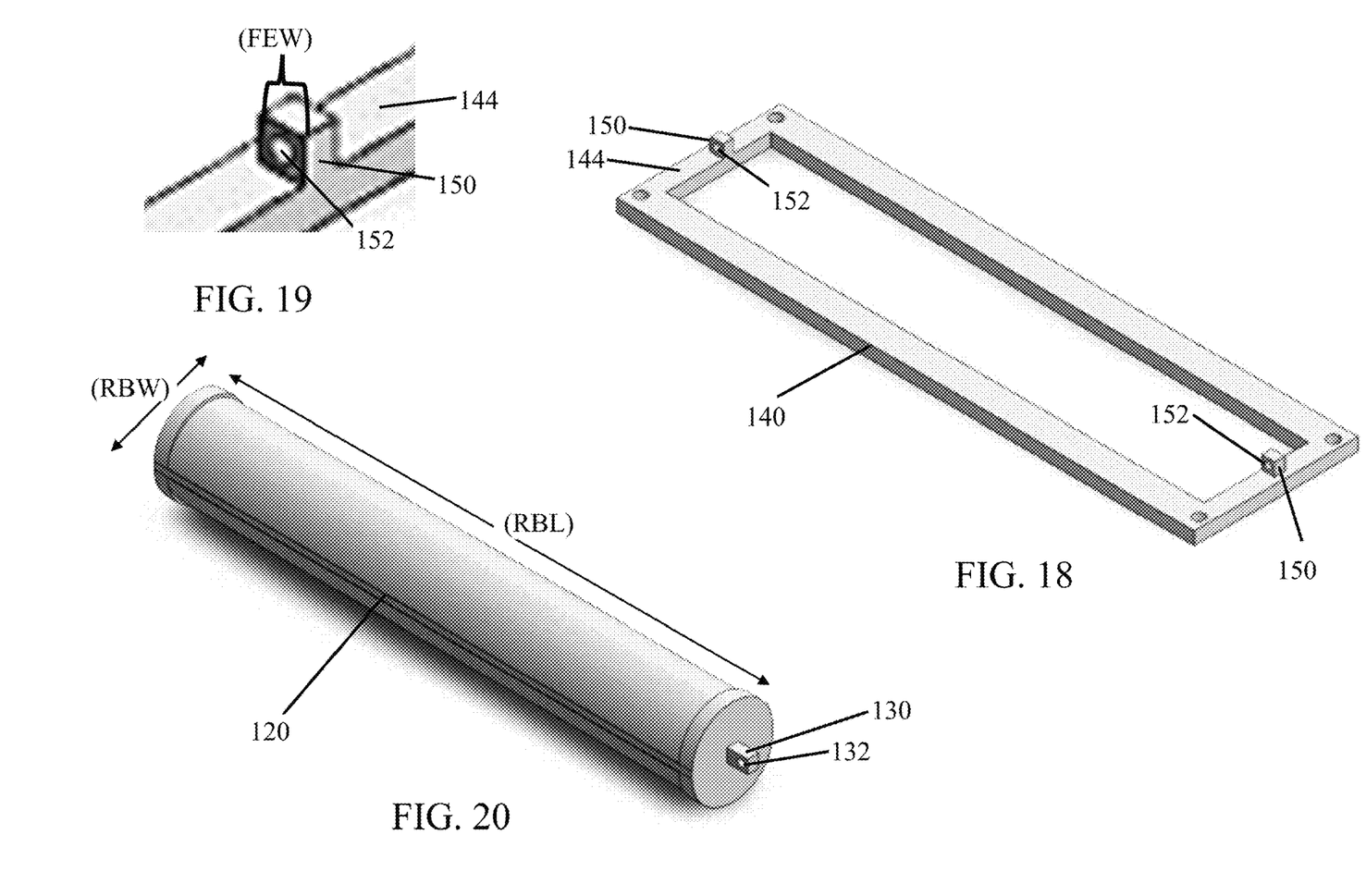
FIG. 18 is an illustration of a trap frame with a frame extension.
FIG. 19 is an illustration of an enlarged view of a frame extension.
FIG. 20 is an illustration of a recovery buoy with a connector flange.

In an alternative embodiment, a trap frame 140 has at least one frame extension 150 that protrudes or extends from a front or outer side of a side arm 144. In a more particular embodiment, a trap frame has at least one frame extension rising from a front or outer side of a side arm on each side of the trap frame, as shown, for example, in FIGS. 14 and 16B. In a further embodiment, a frame extension has a first through bore 152 for receiving an attachment component 340. The first through bore can go through the frame extension. In one embodiment, the first through bore can go through from the top to the bottom and is approximately parallel to the side arm, such that when a trap having a trap accessory thereon is placed for use, the first through bore is approximately perpendicular to the surface on which the trap is supported, or, stated another way, the first through bore is approximately parallel to the side arm. FIG. 18 illustrates an example of a first through bore in a frame extension. In a specific embodiment, a frame extension 150 has an inside edge 154 that extends to at or about the side of the slot 145, such that the slot is not covered by the frame extension, thus the first through bore can be on the front of the trap frame.

Figure 7:
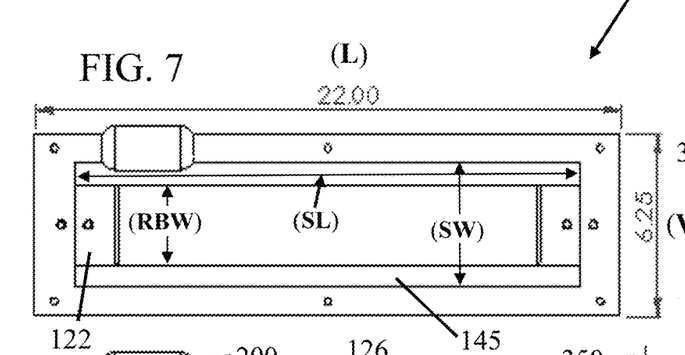
FIG. 7 is a schematic drawing of an embodiment of a trap accessory, according to the subject invention, as seen from a top view.

A trap frame 140, such as shown in FIG. 7, can have a length (L) of between approximately 20 inches and approximately 24 inches and a width (W) between approximately 5.5 inches and approximately 7 inches. In a more particular embodiment, the trap frame has a length between approximately 21 inches and approximately 23 inches and a width between approximately 6 inches and approximately 6.5 inches. In a specific embodiment, the trap frame has a length of approximately 22 inches and width of approximately 6.25 inches. A shelf 146 can extend into a slot sufficiently to permit attachment of a recovery buoy, as discussed below. In one embodiment, the shelf extends between approximately 0.5" and approximately 1.5" into the slot. A frame extension 150 can have a length (FEL) that is equal to or less than the length of a side arm 144 and a width (FEW) of between approximately 0.5" and approximately 1".

A recovery buoy 120 can be arranged within the recessed slot 145 of a trap frame. In one embodiment, a recovery buoy is supported on and operably connected to the outside or front side of at least one shelf 146. When released or deployed the recovery buoy moves out or away from the front side of the shelf and the trap frame 140, which opens the slot and provides an escape route or exit for aquatic animals. In an alternative embodiment, a recovery buoy is operably attached or connected to one or more extensions 150 extending or jutting from a side arm 144 of the trap frame. When released or deployed the recovery buoy can move out or away from the one or more extensions, which also opens the slot and provides an escape or exit for aquatic animals to leave the trap.

Figures 3, 4, 5:
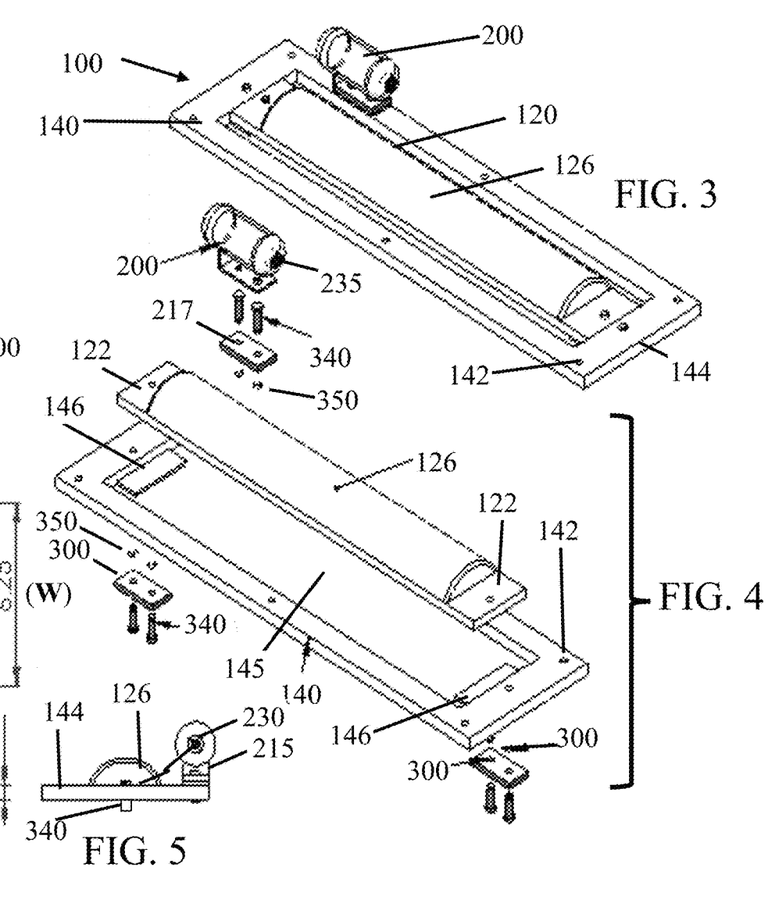
FIG. 3 is a schematic drawing of an embodiment of an assembled trap accessory, according to the subject invention.
FIG. 4 is an exploded view of an embodiment of a trap accessory depicting: a trap frame, degradable latches with attachment components, a recovery buoy, and a buoy line canister.
FIG. 5 is a schematic drawing of an embodiment of a trap accessory, according to the subject invention, as seen from a right end view.
Figure 8:
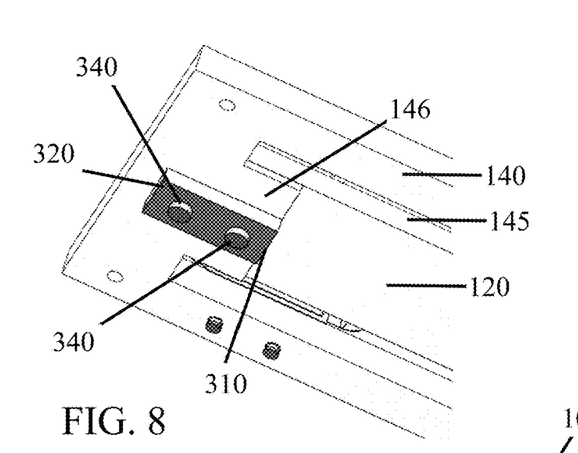
FIG. 8 is a schematic drawing of an embodiment of a side of a trap accessory, according to the subject invention, as seen from a bottom view.
Figure 21:
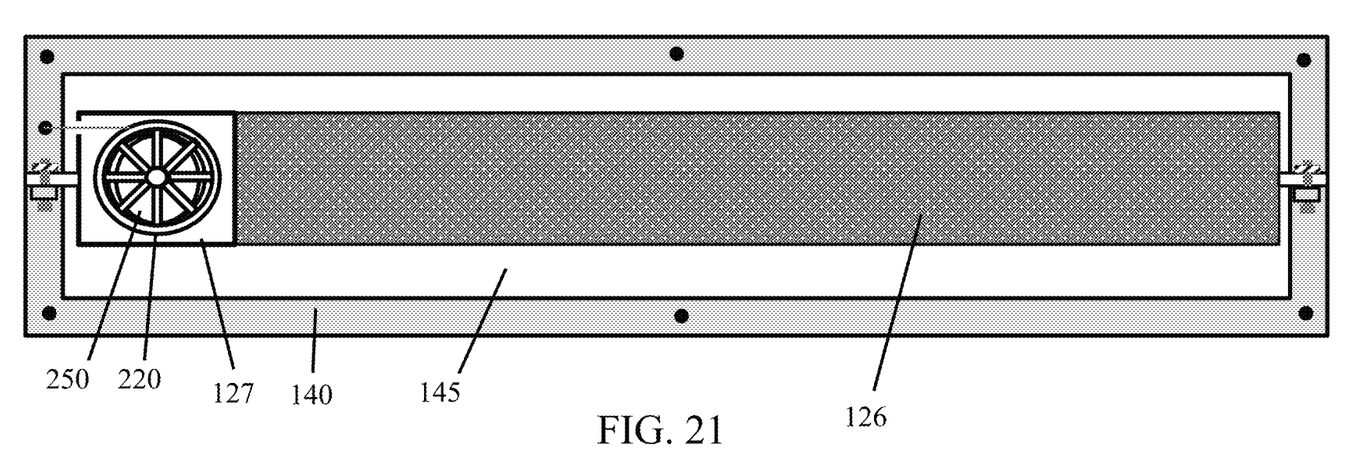
FIG. 21 shows a non-limiting example of a recovery buoy with a float chamber filled with a foam material and a built-in buoy line chamber.

The recovery buoy 120 can float at or near the water surface where it can be seen and recovered. In one embodiment, the recovery buoy is manufactured from a buoyant material, such as, for example, a low-density plastic. In another embodiment, the recovery buoy has an enclosure, bladder, or float chamber 126 that can be filled with or otherwise can contain or retain a buoyant material. FIG. 21 shows a non-limiting example of a float chamber filled with a foam material. The recovery buoy can further be operably connected to the at least one shelf 146, as mentioned above. In one embodiment, the recovery buoy has at least one overhang flange 122 that is placed against, abuts, or drops onto the top or outside of a shelf 146, such that the recovery buoy faces or is directed outward from the trap. As mentioned above, the shelf can be recessed into the slot, such that the overhang flange is flush with or approximately flush with the front of the trap frame. FIGS. 3, 4 and 8 illustrate an embodiment of a recovery buoy with an overhang flange arranged on the top or outside of a shelf, so the buoy is facing away from the trap.

Figure 14:
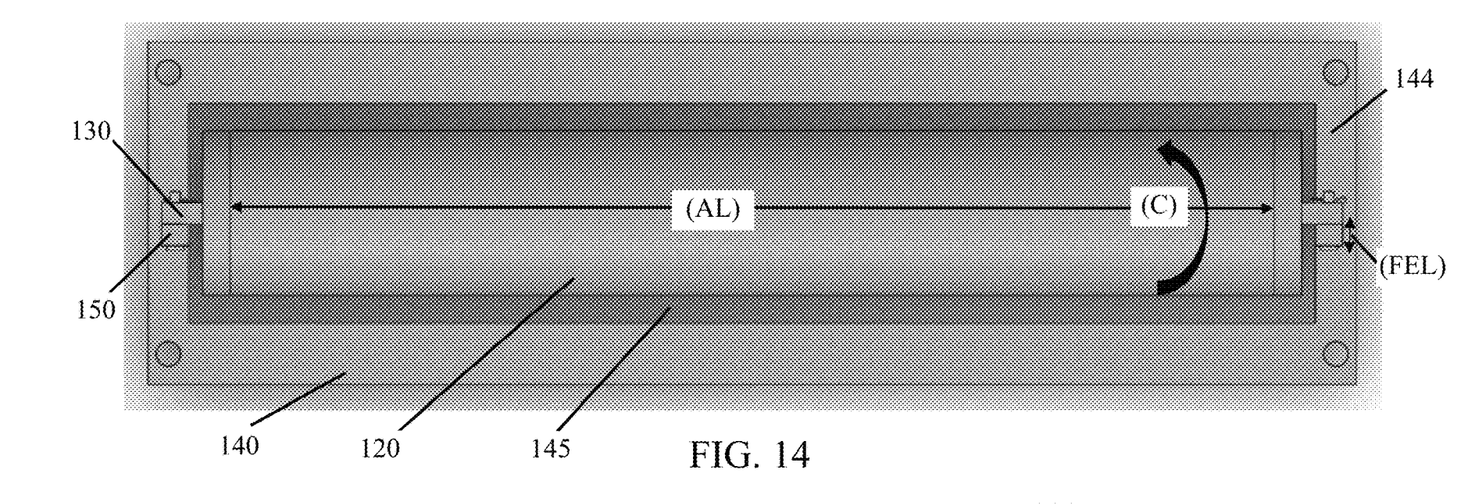
FIG. 14 is an illustration of an alternative embodiment of a trap accessory, according to the subject invention, which utilizes a cylindrical recovery buoy secured with attachment flanges and an attachment component.

An alternative embodiment utilizes a recovery buoy 120 having at least one connector flange 130. A connector flange can be operably connected to a frame extension 150 on a trap frame 140 utilizing an attachment component 340, discussed below. The connector flange can have a second through bore 132. In one embodiment, the second through bore goes through the connector flange. In one embodiment, a recovery buoy has a connector flange extending from an end that is nearest a side arm 144 of a frame prior to deployment, which is shown, for example, in FIG. 20. The connector flange can have a length (CFL) sufficient to extend from the end of the recovery buoy and overlap a connector flange 130 on the side arm, as shown, for example, in FIG. 16A. Preferably, the connector flange can be arranged on the top of the frame extension 150, such as in the example shown in FIGS. 16A and 16B, which can facilitate deployment of the recovery buoy, as discussed below. The first through bore 152 in the frame extension 150 can be aligned with or colinear with the second through bore 132 in the connector flange, as shown, by way of example, in FIG. 16B. In one embodiment, the second through bore can be arranged approximately parallel to the side arm, such that when a trap having a trap accessory thereon is placed for use, the second through bore is approximately perpendicular to the surface on which the trap is supported, or, as stated another way, the second through bore can be approximately parallel to the side arm. FIG. 14 illustrates an example of a frame extension 150 and a first through bore 152 parallel to the side arm 144 and a connector flange 150 positioned over and supported on the frame extension with the second through bore 132 colinear with the first through bore.

The shape and size of a recovery buoy 120 can depend on the configuration of the trap frame 140 and the type of trap 15 to which the trap accessory 100 will be attached. Typically, a rectangular or similar shape is advantageous a trap frame, because this can correspond to the shape of conventional slat traps and, more particularly, to the side of a conventional slat trap where the trap accessory can be installed or attached to a trap. Likewise, a recovery buoy can have a shape that corresponds to the size and shape of the slot 145 in the trap frame. In one embodiment, a recovery buoy can have a flat bottom or inner side that and a semi-circular outside surface, as shown, for example, in FIGS. 3, 4, and 5. An overhang flange 122 can extend from the flat bottom and to the side of the recovery buoy. In another embodiment, a recovery buoy can be a cylinder, as shown, for example, in FIG. 20. A connector flange 130 can extend from each end of the cylinder to be supported on a frame extension 150 on the trap frame side arm 144. In one embodiment the recovery buoy length (RBL) is between approximately 18 inches and approximately 21 inches and the recovery buoy diameter or width (RBW) is between approximately 2 inches and approximately 4 inches. In a more particular embodiment, the recovery buoy length (RBL) is approximately 20 inches and the recovery buoy width (RBW) is approximately 3.25 inches. In a particular embodiment, the recovery buoy width (RBW) is less than the slot width of (SW). In an embodiment with a cylindrical recovery buoy, the circumference (C) is between about 8.5 inches and about 9.5 inches. In a further more specific embodiment, the slot 145 width (SW) is approximately 1 inch to approximately 1.5 inch larger than the (RBW). In a further, more specific embodiment, the slot width is approximately 4 inches and the slot length (SL) is approximately 20.5 inches to approximately 21 inches.

Figure 6:
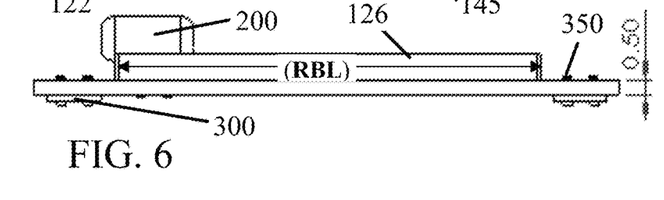
FIG. 6 is a schematic drawing of an embodiment of a trap accessory, according to the subject invention, as seen from a side view.

In one embodiment of the subject invention, at least one latch 300 having a first end 310 and a second end 320 is utilized to operably connect the recovery buoy to the trap frame 140. More specifically, embodiments of the subject invention utilize at least one latch with a first end 310 to which is operably connected the recovery buoy 120 and the at least one shelf 146 projecting into the slot 145 in the trap frame and a second end 320 that attaches the latch to the trap frame, which is shown, for example, in FIGS. 1, 4, 5, 6, 7, and 8. In one embodiment, a latch is operably connected with at least one attachment component 340 arranged through the latch, one example of which is shown in FIGS. 4 and 6. The latch can have a first end 310 and attachment components can operably connect the latch between the bottom of the trap frame and a shelf 146, to secure the shelf to an overhang flange arranged on the upper side of the shelf. Stated another way, the attachment component can operably connect the latch, the shelf, and the overhang flange, such that the shelf is sandwiched between the latch and the overhang flange. The second end 320 of the latch can be attached to the back side of the trap frame with the one or more attachment components. As discussed in more detail below, any one or more of these components can be made of a material that degrades in an aquatic environment. This can ensure that when the latch and/or the one or more attachment components sufficiently degrade to a point of failure the latch and/or an attachment component breaks or separates and the recovery buoy is released to float away from the trap frame.

Figure 9:
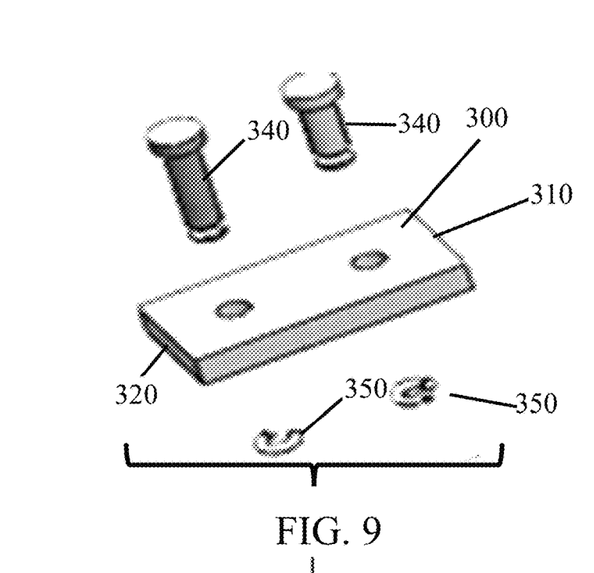
FIG. 9 is an exploded view of a degradable latch with attachment components that can be used to operably connect a latch to a trap accessory. In this embodiment, the attachment components are clevis pins with clips. Embodiments where the latch is made of a steel and the clevis pins are a Degradable Metal (DM), the cathode/anode (C/A) areal ratio is high. Embodiments where the latch is a DM and the clevis pins are steel, the C/A areal ratio is low.
Figure 10:
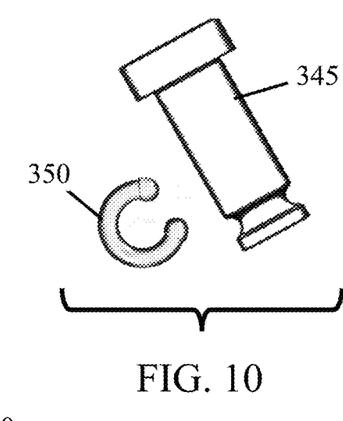
FIG. 10 is an exploded view of an embodiment of a clevis pin and clip, which can be utilized to operably connect a latch to an embodiment of trap accessory according to the subject invention. With this embodiment, one of the clevis pin or the clip is made of a degradable DMs material.
Figure 23:
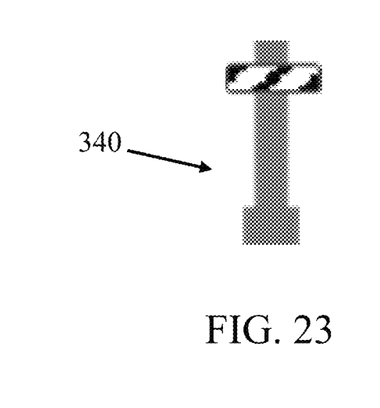
FIG. 23 shows an enlarged view of the attachment component embodiment utilized to secure the recovery buoy shown in FIG. 21.

FIGS. 8 and 9 show non-limiting examples of a latch 300 with a first end 310 and a second end 320 and at least two attachment components 340 that can be utilized to operably connect a recovery buoy 120 to the trap frame 140. In one embodiment, an attachment component is 340 a clevis pin 345 with securing clips 350, such as a cotter pin, R-clip, cotter clip or any of a variety of securing clips used with clevis pins known to a person with skill in the art. FIG. 10 illustrates an embodiment of an attachment component that has a grooved clevis pin held in place with a clip. Other types of attachment components could also be utilized, such as, for example, a nut and bolt combination, such as shown, for example, in FIG. 23, a securing clip can also be used alone, or other types of clevis pin combinations. In a particular embodiment, the attachment component has at least two cooperating pieces or components, such that one can be a "sacrificial" component that degrades to a point of failure, such that it breaks, degrades, dissolves, or otherwise reduces in size and strength sufficiently to allow release of the recovery buoy.

Figure 13:
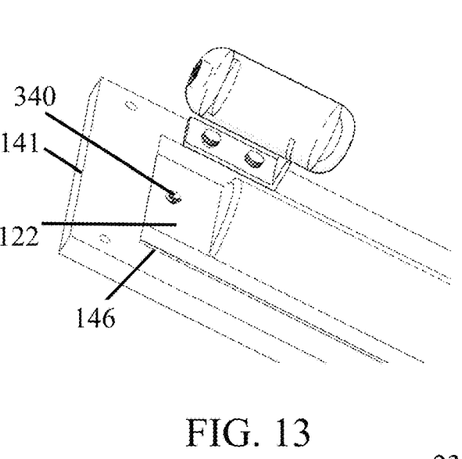
FIG. 13 is an illustration of a portion of a trap accessory, according to the subject invention, which show an attachment component for operably connecting an overhang flange of a recovery buoy to a shelf of a trap frame without an additional latch.
Figure 15:
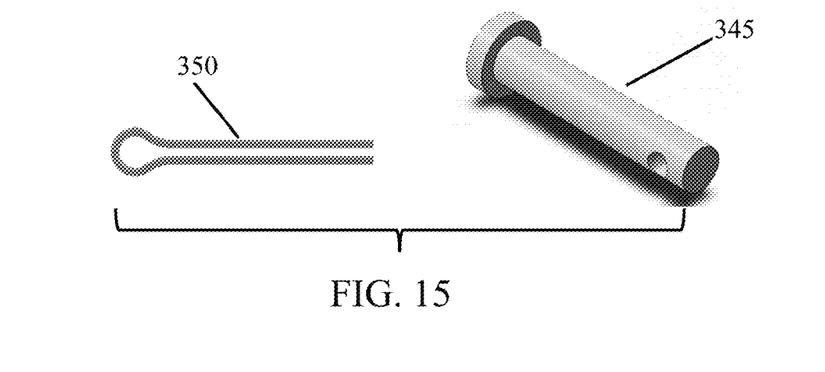
FIG. 15 is an illustration of embodiments of attachment components, according to the subject invention. As shown, an attachment component is a cotter bolt and cotter pin that can be used to secure the attachment flanges. Alternatively, a cotter pin can be used alone to secure the flanges.

In an alternative embodiment, shown, for example, in FIGS. 5 and 13, at least one attachment component 340 is utilized to operably connect the overhang flange 122 of a recovery buoy 120 to a shelf 146 of a trap frame 140, without using a latch. In another alternative embodiment, shown, for example, in FIGS. 14, 16A, 16B, and 23, at least one attachment component is utilized to operably connect at least one frame extension 150 on a trap frame 140 to at least one connector flange 130 on a recovery buoy 120. In a particular embodiment, the attachment component is a clevis pin, such as shown, for example, in FIG. 15, utilized to operably connect a frame extension 150 on a trap frame 140 to a connector flange 130 on a recovery buoy 120. A cotter pin can be utilized to hold the clevis pin in place, which is inserted from the frame extension to the connector flange. In a specific embodiment, the clevis pin is about 1.5 inch in length and the cotter pin is about ½ inch in length. Other sizes and configurations of a clevis pin and cotter pin could also be utilized. With these alternative embodiments, the attachment component can comprise at least two parts, wherein one of the parts, or some portion thereof, can degrade to the point of failure to release the recovery buoy.

Degradable metals (DMs) are metals and alloys that corrode gradually while expected to maintain mechanical integrity for a predetermined period. There are three classes of DMs (i.e., Mg-based, Fe-based, and Zn-based), of which Mg-based DMs have been the most researched (Munroe et al. 2013). Fe-based DMs, particularly the Fe—Mn—Si alloys are advantageous in terms of cost and degradation rates that can be tailored by microstructure adjustment and electro reforming (Huafang Li et al. 2014). Generally, the corrosion rate of electroformed iron is higher due to smaller grains, which provide higher grain boundary area that is more susceptible to corrosive attack (Moravej M. et al. 2010). Zinc has been widely used as an alloying element in Mg-based DMs (Gill et al. 2012). Zn-based DMs have degradation rates between the fast Mg-based DMs and the slow Fe-based DMs. In one embodiment, a degradable material utilized with the subject invention is at least one of a Mg-based, Fe-based, and Zn-based metal.

Two corrosion phenomena can control the degradation rate of DM metals and components made thereof: a) Galvanic corrosion, where coupling of dissimilar metals in an electrolyte (seawater) will cause degradation of the more reactive metal or "sacrificial" component, which acts as an anode, and provides protection for the less reactive metal (steel), which acts as a cathode, and b) cathode/anode (C/A)

areal ratio that controls the degradation rate of the DM component. When the C/A areal ratio is high, the corrosion rate at the anode will be high and when the C/A areal ratio is low, the corrosion rate at the anode will be low (Chilingar, G. et al. 2008)

Figure 11:
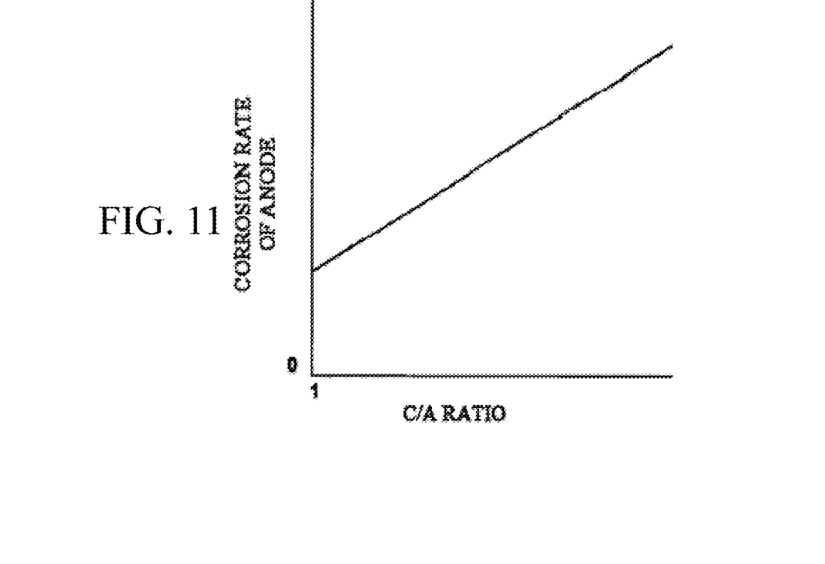
FIG. 11 is a graph illustration C/A areal ratio versus corrosion rate of anode (Chilingar G. et al. 2008).

In one embodiment, the latch 300 is formed of a steel material and the attachment components, such as, for example, one or more clevis pins, are formed of DMs, which causes the clevis pins to be heavily corroded when immersed in seawater. As mentioned above, the recovery buoy is buoyant and, as such, can exert a constant force on the latch and attachment components when submerged. Thus, when the clevis pins fail, the recovery buoy can automatically separate from the trap frame. In an alternative embodiment, the clevis pins are formed of a steel material and the latch is formed from DMs, so there will be only slight corrosion of both the steel bolts and the DMs latch will be heavily corroded upon immersion in the aquatic environment. Failure of the latch, which can include breakage, allows the recovery buoy to separate from the trap frame. In another alternative embodiment, the latch and the clevis pins can be formed of a steel material and the securing clips 350 around the clevis pins can be DMs. Failure of the securing clips can release the bolts, which will disengage from at least the recovery buoy to allow deployment of the recovery buoy. FIG. 11 shows the relationship between C/A areal ratios and the corrosion rate of the anode. This relationship can be advantageously exploited with embodiments of the subject invention, by selecting attachment components and/or latch materials with appropriate C/A areal ratios. Ideally, the C/A ratio provides release of the recovery buoy at between about 8 months to about 14 months, preferably between about 9 months and about 12 months of submersion in an aquatic environment.

Figure 12:
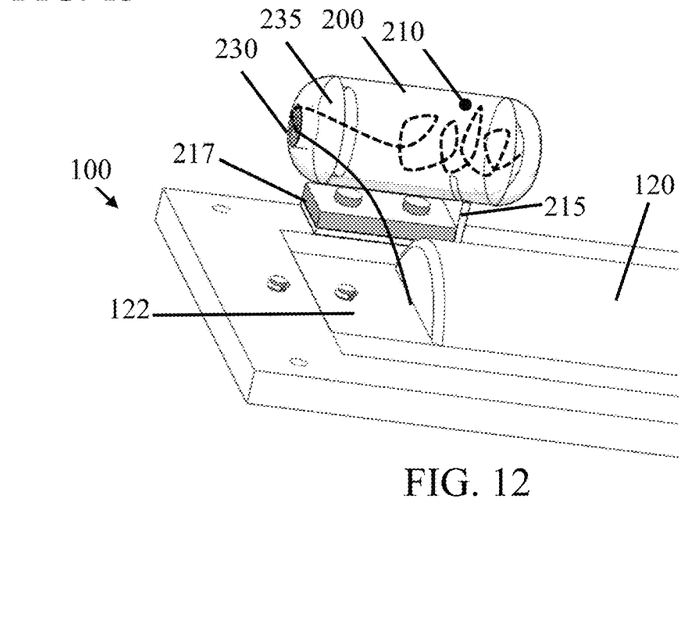
FIG. 12 is an illustration of a portion of a trap accessory, according to the subject invention, which shows an embodiment of a buoy line canister and a buoy line attached to a recovery buoy.

When deployed to float at or near the water surface, a recovery buoy 120 can indicate the location of a lost, derelict, or otherwise unaccounted for trap in the aquatic environment. To facilitate locating the lost trap, a buoy line 250 can extend between the trap and the recovery buoy. In one embodiment, a buoy line canister 200 is cooperatively connected to the trap frame 140 and retains the buoy line 250 therein, an example of which is shown in FIG. 12. Attachment of the buoy canister to the trap frame can provide an advantageous one-piece trap accessory 100 that can be fixedly attached to a trap 15.

Figure 1:
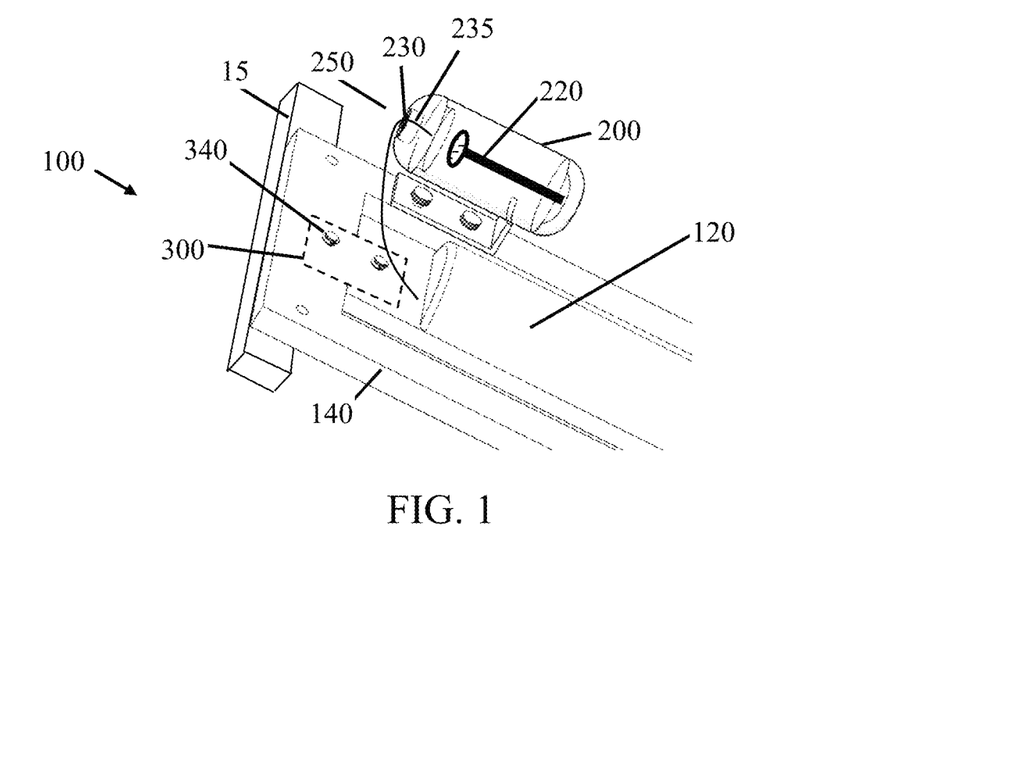
FIG. 1 is an illustration an embodiment of one side of a trap accessory, according to the subject invention, with a buoy line canister.

Buoy line can be arranged within the buoy line canister that facilitates release as the recovery buoy 120 floats to the water surface. In one embodiment, the buoy line is loose-wrapped or loose-wound, such as shown, for example, in FIG. 12, and placed within the buoy line canister. In another embodiment, the buoy line canister has a spool 220 therein around which the buoy line can wind, an example of which is shown in FIG. 1. The buoy line canister can be further configured with an outlet 230 through which the buoy line passes to maintain operable attachment to the recovery buoy 120. In one embodiment, there is a seal 235 within the outlet through which the buoy line extends that inhibits ingress of the aquatic environment, including sea water and other animals and microorganisms, into the buoy line canister interior 210. The seal can be advantageous in inhibiting degradation of the buoy line prior to deployment of the recovery buoy.

The buoy line canister 200 can be fixedly attached to the trap frame 140 to maintain the connection between the trap and the released recovery buoy 120. FIGS. 1 and 12 show the buoy line canister attached to a bracket 215 that can be bolted, screwed, nailed, adhered, or otherwise, fixedly attached to the trap frame. In a further embodiment, a gasket, spacer, or other protective pad 217 can be used with the bracket to inhibit torquing or loosening of the bracket when the recovery buoy is deployed and floating on the water surface. As mentioned previously, the buoy line canister with buoy line therein can be a replaceable component on the trap accessory.

Figure 22:
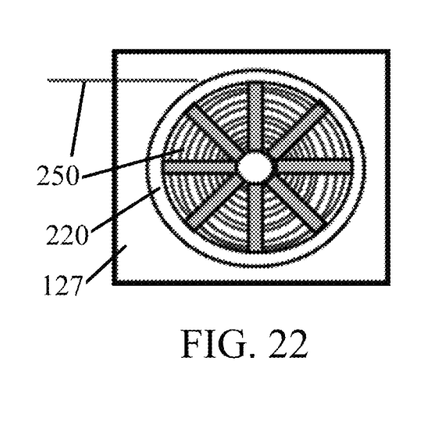
FIG. 22 shows an example of buoy line wound around a spool within a buoy line chamber and having one end of the buoy line extending out of the chamber.

In another embodiment, the float chamber 126 of a recovery buoy has a built-in buoy line chamber 127, an example of which is shown in FIG. 21. Buoy line 250 can be stored in the buoy line chamber and have one end that extends through an opening in the buoy line chamber to be fixedly attached to the trap frame 140, as shown, in FIG. 21. The opposite end can be secured within the buoy line chamber. The buoy line can alternatively be wound around a spool 220, such as, for example, that utilized for conventional monofilament fishing line, but other types of spools could also be utilized. FIG. 22 shows an example of buoy line wound around a spool within a buoy line chamber and having one end of the buoy line extending out of the chamber. The spool can be held in the buoy line chamber. When the recovery buoy is deployed, the buoy line is pulled from or is unspooled from the buoy line chamber as the recovery buoy floats to the water surface.

Figures 16A, 16B, 17:
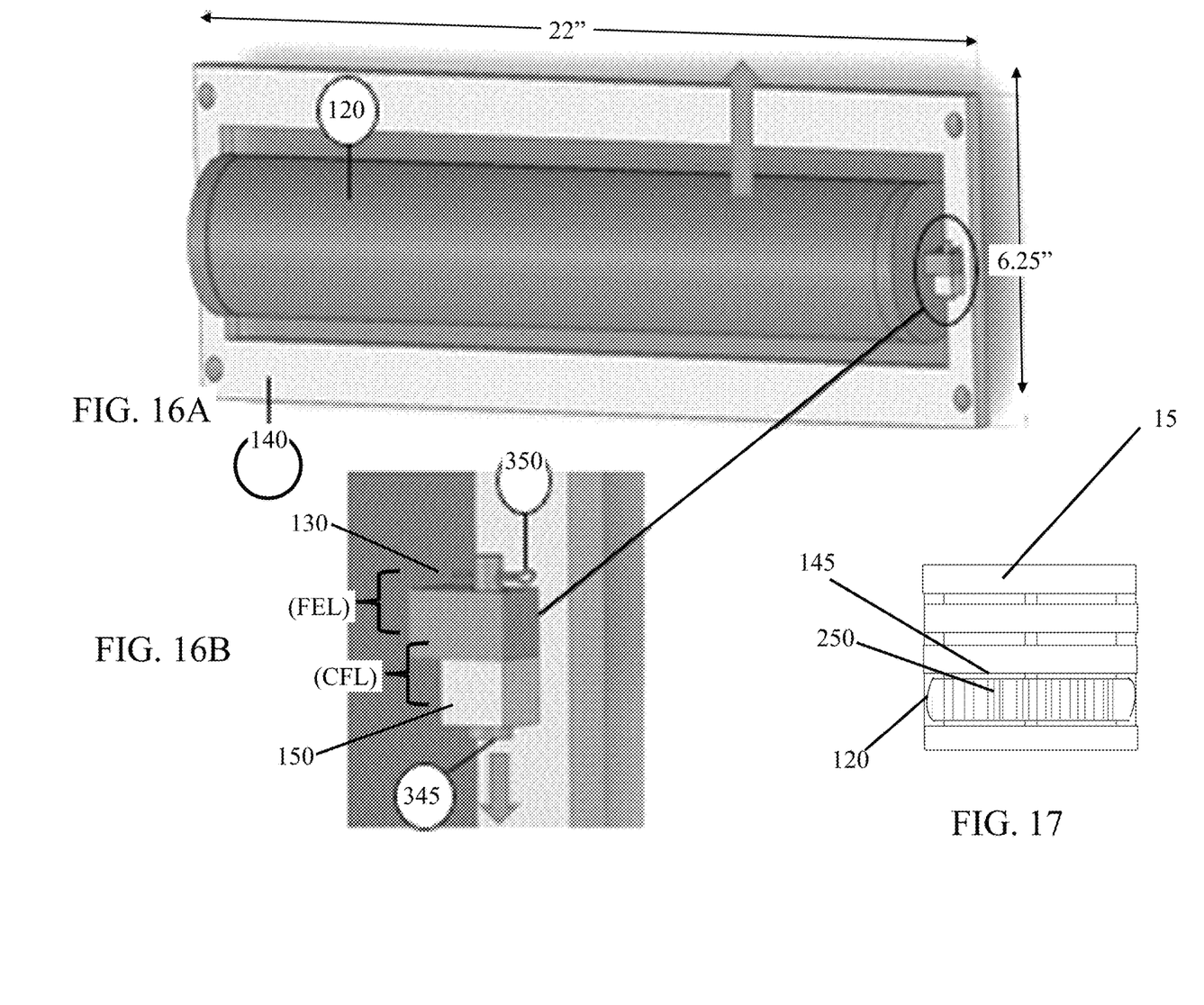

A recovery buoy can also act as a spool around which buoy line 250 can be wound. FIGS. 14, 16A, and 20 shown an embodiment of a cylindrical recovery buoy 120. With this embodiment, buoy line can be wound around the cylindrical portion and secured to the recovery buoy at the one end and the trap frame at the second end. The length of buoy line that can be wound around the cylindrical recovery buoy can depend on the diameter of the buoy line, the circumference and length of the cylindrical recovery buoy, the available space in the slot on each side of the recovery buoy, and other factors understood by a person with skill in the art.

In a specific embodiment, the cylindrical recovery buoy 120, such as shown in FIG. 14, has an available length (AL) of about 19 inches around which buoy line 250 can be wound and a circumference of about 9 inches. By way of example, buoy line having a diameter of about 0.063 inches can be wound around this cylindrical recovery buoy, with the line side by side along the (AL) about 300 times. Alternatively, the buoy line can be wound in layers, each having approximately 150 windings. This will provide approximately 112.5 feet of buoy line per layer. If the slot width (SW) is about 4", the buoy line can be wound in about seven layers to provide a clearance on either side of the recovery buoy of about 0.5 inches. FIG. 17 shows an example of a cylindrical buoy with buoy line wound around the (AL) in layers.

Trap fisheries (lobster, stone crab, blue crab) lose on average about 18% of traps (approximately 82,0000) in Florida coastal waters, at an estimated annual loss of about $3M. These lost or "ghost" traps typically remain intact and will continue indiscriminately to capture and kill long after the trap season has ended. Some estimates indicate that this results in about a 10% loss in the lobster fishery alone. Embodiments of the subject invention address this problem by providing a floatable buoy that can disable or deactivate lost traps by opening an escape slot in the trap. The buoy is attached by aquatic degradable components configured to release the buoy after a predetermined amount of time submerged in an aquatic environment. The buoy can be useful as an indicator of the trap location allowing for recovery of the trap.

All patents, patent applications, provisional applications, and other publications referred to or cited herein are incorporated by reference in their entirety, including all figures and tables, to the extent they are not inconsistent with the explicit teachings of this specification. Additionally, the entire contents of the references cited within the references cited herein are also entirely incorporated by reference.

The examples and embodiments described herein are for illustrative purposes only and that various modifications or changes in light thereof will be suggested to persons skilled in the art and are to be included within the spirit and purview of this application.

The invention claimed is:

1. A trap accessory, configured to be operably attached to a trap utilized in an aquatic environment, the trap accessory comprising:
a trap frame comprising a slot and a frame extension, wherein the trap frame is configured to be removably attached to the trap;
a buoyant recovery buoy arranged in the slot and comprising a connector flange extending from one end thereof, the recovery buoy being releasably attached to the frame extension of the trap frame via the connector flange;
a buoy line fixedly connected to the trap frame and to the recovery buoy;
an attachment component that operably and releasably connects the connector flange to the frame extension,
wherein the attachment component comprises a degradable metal that degrades in the aquatic environment such that, when the attachment component degrades to a point of failure, the connector flange becomes unattached from the frame extension,
wherein, when the attachment component degrades to the point of failure, the recovery buoy floats away from the slot of the trap frame to an outside water surface of the aquatic environment and provides an exit in the trap, the outside water surface being where the aquatic environment meets an air atmosphere,
wherein, when the recovery buoy floats away from the slot of the trap frame, the buoy line extends between the trap frame and the recovery buoy,
wherein the recovery buoy is arranged in the slot such that it extends in a first direction from a first end of the trap frame to a second end of the trap frame, and
wherein the frame extension protrudes from the trap frame in a second direction perpendicular to the first direction.

2. The trap accessory according to claim 1, wherein the buoy line is wound around the recovery buoy and unwinds when the recovery buoy floats away from the slot of the trap frame.

3. The trap accessory according to claim 1, further comprising a buoy line cannister fixedly attached to the trap frame for storing the buoy line.

4. The trap accessory according to claim 1, further comprising a buoy line chamber in the recovery buoy for storing the buoy line.

5. The trap accessory according to claim 4, further comprising a spool within the buoy line chamber around which the buoy line is wound and from which the buoy line is unwound when the recovery buoy floats away from the slot of the trap frame.

6. The trap accessory according to claim 1, wherein the degradable metal of the attachment component comprises at least one of an Mg-based degradable metal, an Fe-based degradable metal, and a Zn-based degradable metal.

7. The trap accessory according to claim 6, wherein the attachment component degrades to the point of failure at between about 9 months and about 12 months.

8. The trap accessory according to claim 1, wherein the attachment component comprises a clevis pin and a securing clip configured to go through a hole of the clevis pin.

9. A method for disabling a trap in an aquatic environment, the method comprising:
obtaining the trap accessory according to claim 1; and
operably attaching the trap accessory over a gap in the trap prior to use in the aquatic environment.

10. The method according to claim 9, further comprising:
positioning the trap within the aquatic environment for a time sufficient to allow degradation of the attachment component to the point of failure, such that the recovery buoy floats away from the slot of the trap frame, which is operably attached to the trap, to the outside water surface of the aquatic environment and opens the slot in the trap accessory, which provides the exit in the trap.

11. The method according to claim 10, wherein the method further comprises utilizing the recovery buoy and the buoy line, after the recovery buoy has floated to the outside water surface, to recover the trap from the aquatic environment.

12. The method according to claim 11, wherein the buoy line is at least one of wound around the recovery buoy, stored in a buoy line cannister fixedly attached to the trap frame, and stored in a buoy line chamber in the recovery buoy prior to the recovery buoy floating away from the slot of the trap frame.

13. The method, according to claim 12, further comprising a spool within the buoy line chamber or the buoy line cannister around which the buoy line is wound and from which the buoy line is unwound when the recovery buoy floats away from the slot of the trap frame.

14. The method, according to claim 10, wherein the attachment component comprises at least one of an Mg-based degradable metal, an Fe-based degradable metal, and a Zn-based degradable metal.

15. The method, according to claim 14, wherein the attachment component degrades to the point of failure at between about 9 months and about 12 months.

16. The method according to claim 9, wherein the attachment component comprises a clevis pin and a securing clip configured to go through a hole of the clevis pin.

17. A trap accessory, configured to be operably attached to a trap utilized in an aquatic environment, the trap accessory comprising:
a trap frame comprising a slot and a frame extension, wherein the trap frame is configured to be removably attached to the trap;
a buoyant recovery buoy arranged in the slot and comprising a connector flange extending from one end thereof, the recovery buoy being releasably attached to the frame extension of the trap frame via the connector flange, and the recovery buoy being cylindrical;
a buoy line fixedly connected to the trap frame and to the recovery buoy;
a buoy line chamber containing the buoy line; and
an attachment component that operably and releasably connects the connector flange to the frame extension,
wherein the attachment component comprises a degradable metal that degrades in the aquatic environment such that, when the attachment component degrades to a point of failure, the connector flange becomes unattached from the frame extension, wherein, when the attachment component degrades to the point of failure, the recovery buoy floats away from the slot of the trap frame to an outside water surface of the aquatic environment and provides an exit in the trap, the outside water surface being where the aquatic environment meets an air atmosphere, wherein, when the recovery buoy floats away from the slot of the trap frame, the buoy line extends between the trap frame and the recovery buoy, wherein, when the recovery buoy floats away from the slot of the trap frame, the buoy line is pulled from the buoy line chamber, wherein the degradable metal of the attachment component comprises at least one of an Mg-based degradable metal, an Fe-based degradable metal, and a Zn-based degradable metal, wherein the recovery buoy is arranged in the slot such that it extends in a first direction from a first end of the trap frame to a second end of the trap frame, and wherein the frame extension protrudes from the trap frame in a second direction perpendicular to the first direction.

18. The trap accessory according to claim 17, further comprising a spool within the buoy line chamber around which the buoy line is wound and from which the buoy line is unwound when the recovery buoy floats away from the slot of the trap frame.

19. The trap accessory according to claim 17, wherein the attachment component comprises a clevis pin and a securing clip configured to go through a hole of the clevis pin.

* * * * *

UNITED STATES PATENT AND TRADEMARK OFFICE
CERTIFICATE OF CORRECTION

| | |
|---|---|
| PATENT NO. | : 12,133,516 B2 |
| APPLICATION NO. | : 17/840947 |
| DATED | : November 5, 2024 |
| INVENTOR(S) | : Mark Butler and Norman Munroe |

It is certified that error appears in the above-identified patent and that said Letters Patent is hereby corrected as shown below:

In the Specification

Column 1, Line 4 insert:
--GOVERNMENT SUPPORT
This invention was made with government support under NA22NMF4270154 awarded by the National Oceanic and Atmospheric Administration. The government has certain rights in the invention.--

Signed and Sealed this
Sixteenth Day of December, 2025

John A. Squires
*Director of the United States Patent and Trademark Office*